C. W. LOTT & J. J. HEIMAN.
COMBINATION GARDEN HOE AND RAKE.
APPLICATION FILED MAR. 4, 1914.

1,133,159.

Patented Mar. 23, 1915.

Witnesses
R. N. Jones.

Inventors
C. W. Lott and J. J. Heiman.
By ............... Jr.
Attorney

UNITED STATES PATENT OFFICE.

CHARLES W. LOTT AND JOHN J. HEIMAN, OF CENTER, COLORADO.

COMBINATION GARDEN HOE AND RAKE.

1,133,159.  Specification of Letters Patent.  Patented Mar. 23, 1915.

Application filed March 4, 1914. Serial No. 822,446.

*To all whom it may concern:*

Be it known that we, CHARLES W. LOTT and JOHN J. HEIMAN, citizens of the United States, residing at Center, in the county of Saguache and State of Colorado, have invented certain new and useful Improvements in Combination Garden Hoes and Rakes; and we do hereby declare the following to be a full, clear, and exact description of the invention, such as will enable others skilled in the art to which it appertains to make and use the same.

This invention relates to new and useful improvements in a combination garden hoe and rake and has for its principal object to provide a device having interchangeable blades, which may be used for several different purposes.

Another object of the invention is to provide a simple and effective means for holding the blades in place and preventing the same from becoming disarranged.

A still further object of the invention is to provide a device which may be secured to the ordinary type of rake or hoe handle without changing the construction thereof in any way.

With the above and other objects in view, the invention consists in a novel combination and arrangement of parts which will be fully set forth in the following specification and accompanying drawings, in which—

Figure 1:
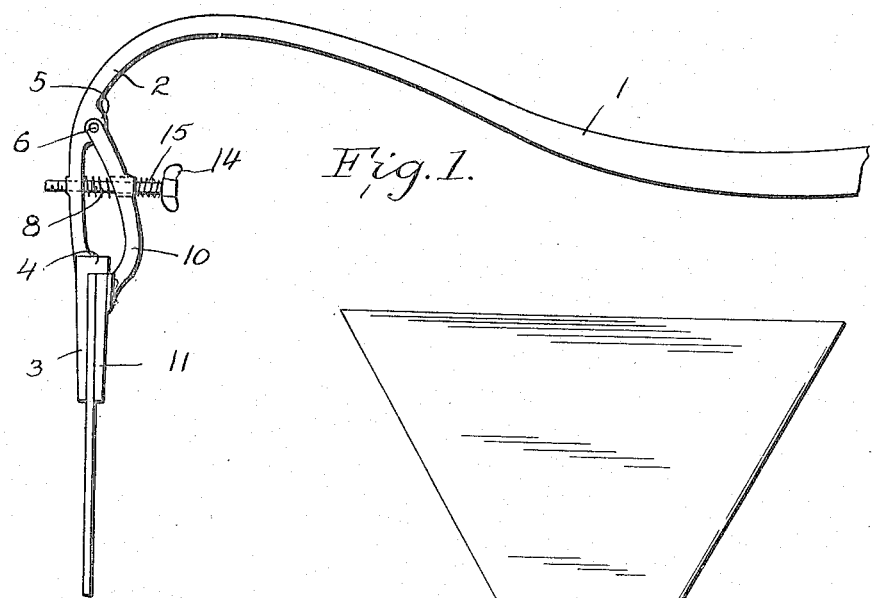
Figure 2:
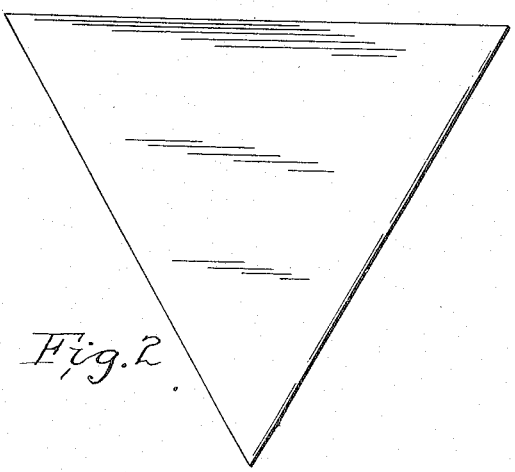
Figure 3:
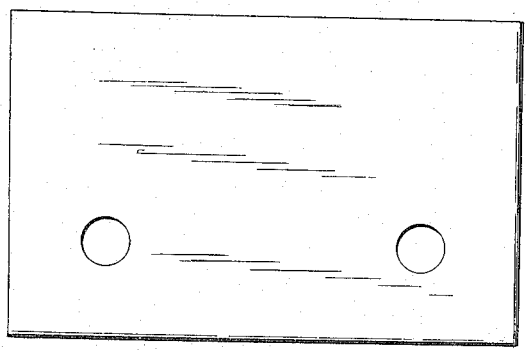
Figure 4:
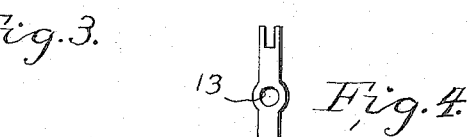
Figure 5:
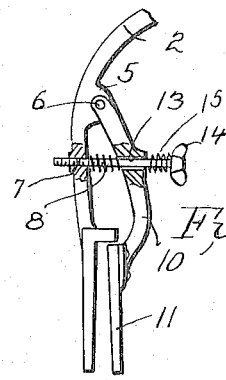

Figure 1 is a side view in elevation of the head of a garden implement, Fig. 2 is an enlarged face view of the blade, Fig. 3 is a view similar to Fig. 2, Fig. 4 is a fragmentary view of one of the jaws, and Fig. 5 is a fragmentary sectional view of the device, showing the same as it would appear when released.

Referring now to the drawings by characters of reference, the numeral 1 designates the shank of the head of this implement, which is adapted to be secured to a handle of the ordinary type. This shank is extended and bent, as at 2, to form the vertical upstanding portion which terminates in the clamp member 3 having formed thereon at the point where it joins the portion 2, the angular extension 4, which forms a shoulder against which the blade abuts when it is in position. An ear 5 is formed on the portion 2 and is provided with an aperture which is arranged to receive the pivot pin 6. Intermediate the ear 5 and the angular extension 4, is provided the internally screw threaded aperture 7 which is arranged to receive the bolt 8 by means of which adjustment of the device is obtained. The inner face of the clamp member 3 is roughened, as at 12, to frictionally engage the blades, which are illustrated in the several different figures.

Pivotally secured to the ear by means of the pin 6 is provided the coöperating clamp member 10 having the plate 11 secured thereto. This plate 11 is provided with a roughened surface, similar to the roughened surface 9, which is designated by the numeral 12. A suitable aperture 13 is formed in the coöperating clamp member 10 intermediate its end, and is arranged to come in direct alinement with the aperture 7 to receive the bolt 8 when the device is in use. A suitable winged head 14 is formed on the bolt and is arranged to provide for the adjustment of said bolt without the necessity of using a wrench or similar tool. A suitable spring 15 is interposed between the coöperating clamp member 10 and the head of the bolt, as clearly shown in Fig. 1, and is adapted to exert pressure against the coöperating clamp member to yieldably hold the same firmly in place.

The blades which are used in connection with this invention are illustrated in Figs. 2, and 3, and are arranged to be interchangeably held between the clamp members and provide a tool which is capable of use for several different purposes.

It will be evident that in use the desired blade is placed between the plates 3 and 11, and the bolt tightened, by means of the head 14, until the blade is firmly held in place, whereupon the implement may be manipulated in the ordinary manner. Should it be desired to change the blade, the only operation necessary is the loosening of the thumb screw, which will permit the blade to be withdrawn and a substitution therefor of the blade which is desired.

While in the foregoing we have shown and described the preferred embodiment of our invention, it is to be understood that minor changes in construction, combination and arrangement of parts may be made without departing from the spirit and scope of the invention as claimed.

Having thus described our invention, we claim:—

A device of the character described comprising a handle portion, an angular extension formed on the handle portion, a clamping member formed on the angular extension, a shoulder formed at the point where the angular extension and the clamping member join, an ear intermediate the ends of the angular extension, said angular extension being provided with a centrally located internally screw threaded aperture, a coöperating clamping member pivoted to the ear, said coöperating clamping member being provided with a centrally located transversely extending aperture adapted to aline with the first mentioned aperture, a plate secured to the coöperating clamping member and adapted to coöperate with the first mentioned clamping member to hold a blade in place, a thumb screw extending through the apertures in the coöperating clamping member and the angular extension, said thumb screw being adapted to adjust the tension on the blade, and a compressed coil spring interposed between the coöperating clamping member and the head of the thumb screw, whereby the coöperating clamping member is forced toward the first mentioned clamping member when the device is in use.

In testimony whereof we affix our signatures in presence of two witnesses.

CHARLES W. LOTT.
JOHN J. HEIMAN.

Witnesses:
C. B. HOCKER,
A. R. SPENCER.

Copies of this patent may be obtained for five cents each, by addressing the "Commissioner of Patents, Washington, D. C."